United States Patent
Harris et al.

(10) Patent No.: US 10,693,884 B1
(45) Date of Patent: Jun. 23, 2020

(54) DEVICE AGNOSTIC SECURITY LAYER AND SYSTEM

(71) Applicant: L3 Technologies, Inc., New York, NY (US)

(72) Inventors: Johnny M. Harris, Layton, UT (US); Andrew R. Austin, Farmington, UT (US); Roland E. Chilinski, Farmington, NY (US); Jeff A. Harrell, Draper, UT (US); D. Victor Wells, Draper, UT (US); Scott B. Terry, Kaysville, UT (US); Craig K. Lyon, West Jordan, UT (US)

(73) Assignee: L3 Technologies, Inc., New York, NY (US)

( * ) Notice: Subject to any disclaimer, the term of this patent is extended or adjusted under 35 U.S.C. 154(b) by 322 days.

(21) Appl. No.: 15/888,656

(22) Filed: Feb. 5, 2018

Related U.S. Application Data (60) Provisional application No. 62/557,849, filed on Sep. 13, 2017.

(51) Int. Cl.
*H04L 29/06* (2006.01)
*H04L 9/08* (2006.01)

(52) U.S. Cl.
CPC .......... *H04L 63/102* (2013.01); *H04L 9/0827* (2013.01); *H04L 63/0435* (2013.01); *H04L 63/105* (2013.01)

(58) Field of Classification Search
CPC . H04L 63/102; H04L 63/0435; H04L 63/105; H04L 9/0827; G06Q 50/30; Y04S 10/54
See application file for complete search history.

(56) References Cited

U.S. PATENT DOCUMENTS

| | | | |
|---|---|---|---|
| 8,499,156 B2* | 7/2013 | Wong | H04L 63/045 713/168 |
| 10,367,793 B2* | 7/2019 | Landais | H04L 9/0836 |
| 2005/0280662 A1* | 12/2005 | Tognoni | G09G 5/20 345/690 |
| 2012/0072098 A1* | 3/2012 | Righi | G06Q 10/06 701/123 |

\* cited by examiner

*Primary Examiner* — Brian F Shaw
(74) *Attorney, Agent, or Firm* — Workman Nydegger (57) ABSTRACT

A network end-point communicates, to a controller, a unique hardware identifier that is associated with a first end-point. The network end-point receives from the controller a first encryption key that is uniquely matched to a decryption key privately held by a second end-point. The network end-point then receives device data from a first device in direct communication with the first end-point. The network end-point communicates the device data to the second end-point, wherein the device data is encrypted using the first encryption key.

20 Claims, 7 Drawing Sheets

DEVICE AGNOSTIC SECURITY LAYER AND SYSTEM

CROSS-REFERENCE TO RELATED APPLICATIONS

This application claims priority to and benefit of U.S. Provisional Patent Application No. 62/557,849, entitled "Device Agnostic Security Layer and System", filed on Sep. 13, 2017, which application is incorporated by reference herein in its entirety.

BACKGROUND

In many computer, networking, and other electronic systems, providing flexible configurations can be a key factor in meeting functional requirements. Computers have long supported plug-and-play hardware where a computer detects an installed device, installs a driver for the device, and then is able to use or otherwise interface with the device. Common interfaces, such as the various USB standards, allow for a variety of devices to be connected to common ports.

Networks also provide similar flexibility. Most networks support connections from a variety of devices communicating with the same protocols. Even in a simple home network, a user may connect computers, smart phones, tablets, televisions, and other smart devices to the network.

In some electronic systems, similar flexibility is desired. However, due to system requirements, such flexibility is not always attainable. Many systems and system components have application specific requirements fixing the type of connectors, the software platform, or the communication scheme. Often, these components require intense and expensive qualification testing in order to be approved for use. Such qualification testing is typically specific to a component's configuration. As such, software and hardware updates may be difficult, costly, or even impossible due to the requirements of requalification or even accessing a system. In some cases, logistical realities may add additional difficulties, including maintenance cycles that only provide for updates after months or even years.

Another aspect of such electronic systems is a desire to provide a distributed system. This allows a user to install components in advantageous positions in a platform. For example, in at least one embodiment, certain components need to be placed for easy access, for example at waist or table height. Other components may only need to be serviceable and are either not commonly used or only provide control or processing functionality. As such, these may be placed in lower or higher positions. Displays or readouts need to be placed where they can be seen.

An alternative example is a vehicle gathering sensor data. The driver or pilot may need access to the system to monitor progress. An operator will need to interface with and control the system. Sensors or communications devices need to be advantageously located to perform their functions. In some cases, there may even be remotely connected devices located in a different vehicle and connected through some non-wired communication means, such as a wireless network or a communications array. The distributed nature of these components may add additional difficulties in updating or otherwise modifying their configuration, as they may not be regularly accessible.

In many systems, as in the above examples, connecting the distributed components requires custom connections and cabling. This can include expensive custom connectors and bulky cables that increase weight, cost, size, and power factors that can negatively impact a system. There is also a need to provide secure communication, which often must be designed into each component independently Further, in many systems, components are designed and updated over many years or even decades. Those skilled in the art often desire to use the most effective or efficient protocols for running components. And, changes in standards and mission requirements often require an update to newer standards. Existing devices, sometimes called legacy devices, often can perform mission functionality, but may not be able to communicate with newer devices or systems. In some cases, they may also fail to meet new standards. The cost of redesigning such components can be very high. Design and qualification cycles can, in some cases, overlap multiple changes to security, communications, or other system standards. And, for changes as simple as a connector, software, or an operating system in a legacy device, the cost of redesign is very high when the key features of such a legacy device are often the communication, sensing, or other end-purpose functionality that is provided.

Some distributed platforms and systems need to be easily reconfigurable while providing multiple layers of security. Many existing legacy devices are unable to provide such security. As such, these distributed platforms and systems will require design of new components or redesign of legacy components to provide integrated security features to meet the security requirements, a common software or operating system, and a common connector scheme to replace the existing legacy devices. They will also require qualification testing. These new components will increase the cost and time of deployment of the distributed systems and, in some cases will require the retirement of legacy devices that can still effectively perform their tasks and are otherwise sound. And, in the near future, these new or redesigned components will likely become legacy components to be phased out when the system standards change again.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In at least one embodiment, a network end-point communicates, to a controller, a unique hardware identifier that is associated with a first end-point. The network end-point receives from the controller a first encryption key that is uniquely matched to a decryption key privately held by a second end-point. The network end-point then receives device data from a first device in direct communication with the first end-point. The network end-point encrypts the device data using the first encryption key and communicates the device data to the second end-point.

Additionally, in at least one embodiment, a controller receives a unique hardware identifier from a first end-point that is in communication with a network. The controller determines that the unique hardware identifier is present within a mission profile. The mission profile comprises an indication of a second end-point to which the first-endpoint is allowed to communicate. The controller communicates to the first end-point a first encryption key that is uniquely matched to a decryption key privately held by the second end-point.

Further, in at least one embodiment, an end-point communicates a unique hardware identifier that is associated with a first end-point and a device profile from the first end-point. The device profile indicates a first device that is in direct communication with the first end-point. A controller receives the unique hardware identifier and the device profile from the first end-point that is in communication with a network. The controller determines that the unique hardware identifier is present within a mission profile. The mission profile comprises an indication of a second end-point to which the first-endpoint is allowed to communicate. The controller then communicates to the first end-point a first encryption key that is uniquely matched to a decryption key privately held by the second end-point and a first translation profile that comprises instructions for communicating over a particular hardware adaptor with the first device. The first end-point receives from the controller the first encryption key. In at least one embodiment, the first end-point also receives the translation profile. The first end-point receives device data from a first device in direct communication with the first end-point. The first end-point then generates translated device data from the device data using the translation profile. The translated device data is translated into a software language that is understandable by a second device in direct communication with the second end-point. The first end-point encrypts the translated device data and communicates it to the second end-point, wherein the device data is decrypted using the first encryption key and delivered to the second device. In another embodiment, the second device receives the translation profile. The first end-point receives device data from a device in direct communication with the first end-point. The first end-point encrypts the device data using the first encryption key and communicates the encrypted data to a second end-point over the network. The second end-point decrypts the data, and translates it using the translation profile into a software language understandable by the second device. The second end-point delivers the translated device data to the second device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

The following discussion now refers to a number of devices, methods, and method acts that may be practiced or performed. Although the method acts may be discussed in a certain order or illustrated in a flow chart as occurring in a particular order, no particular ordering is required unless specifically stated, or required because an act is dependent on another act being completed prior to the act being performed.

Figure 1:
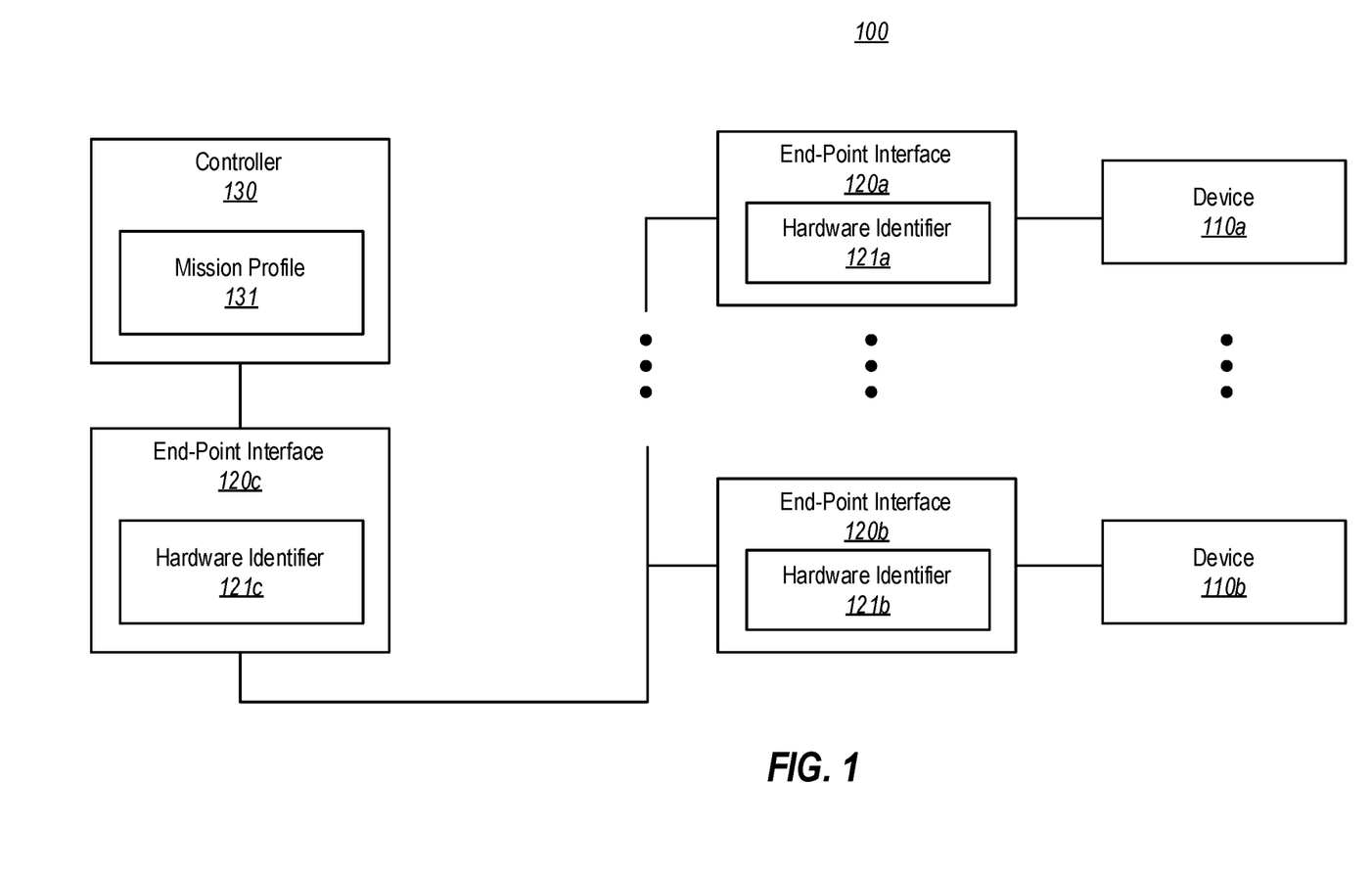
FIG. 1 illustrates an embodiment of a network system with a device agnostic security layer.

Referring now to FIG. 1, an embodiment of a network system 100 is illustrated. The depicted network system 100 comprises devices 110$a$ and 110$b$ connected to end-points 120$a$, 120$b$, and a controller 130 connected to end-point 120$c$. The devices 110$a$ and 110$b$ in various embodiments may perform a variety of functions. Configurations and functions of devices 110$a$ and 110$b$ in the network system 100 may vary between implementations.

Example devices 110$a$ and 110$b$ include radio frequency, transmitters, receivers, encryption devices, decryption devices, attenuators, antennas, antenna controllers, communication systems and devices, sensors, and any other device that is desired to connect to and operate within the network system 100.

In some embodiments of the network system 100, controller 130 is also a device (e.g., device 110$a$, 110$b$). In other embodiments, the controller 130 is present in network system 100, but is treated differently from the devices 110$a$ and 110$b$. For example, in at least one embodiment, the controller 130 is in communication with the network system 100 but is not connected directly to end-point 120$c$. Instead, the controller 130 communicates directly with the end-points 120$a$, 120$b$ that are connected to the devices 110$a$, 110$b$.

The purpose and function of the controller 130 is to provide control over at least a part of the communication within the network system 100. Such control can include addressing, encrypting, sending, receiving, and otherwise routing traffic in the network system 100. In one embodiment, the controller 130 also acts as a decision maker for and within the network system 100.

In at least one embodiment, device 110$a$ in the system is a source, the end-point 120$a$ receives data from the source device 110$a$ and prepares it for secure transmission to intended recipient device 110$b$. In at least one embodiment, the devices 110$a$ and 110$b$ may include both source and recipient devices.

A mission profile 131, within the controller 130, provides details on an intended configuration of the network system 100 for a given mission or application. For instance, end-point 120a, has a unique hardware identifier 121a with which it is associated. The unique hardware identifier 121a identifies the end-point 120a to the controller 130. In at least one embodiment, the mission profile 131 contains the unique hardware identifiers for each end-point that is allowed to communicate on the network. Additionally, the mission profile 131 may also define which end-points are allowed to communicate with each other. Further, in at least one embodiment, each device 110a and 110b is associated with a unique hardware identifier. In such an embodiment, the mission profile 131 also references the unique hardware identifiers that are associated with each device 110a and 110b. In a further embodiment, the mission profile also associates specific end-points with specific devices, such that only an end-point with a particular unique hardware identifier is allowed to communicate with a device that has another specific unique hardware identifier.

As such, based on whether a unique hardware identifier 121b is referenced within the mission profile 131, the controller 130 determines if the end-point 120b is allowed to connect to the network system 100. In at least one embodiment, the controller 130 filters communication packets, network traffic, or network messages such that packets, traffic, or messages are only delivered to the correct end-point. In an alternative or additional embodiment, the end-points 120a, 120b, and 120c also or alternatively perform the filtering by ignoring communication packets, network traffic, or network messages that are not addressed to them specifically. Accordingly, the devices 110a and 110b and controller 130 are physically separated from each other by at least one of the end-points 120a, 120b, and 120c. One skilled in the art will appreciate the security benefits of such a set-up. For example, if a malicious device is connected to the network through end-point 120a, the end-point will physically prevent the malicious device from accessing communications addressed to any other device. Additionally, based upon the mission profile 131, the end-point 120a and/or the controller 130 may also identify that the malicious device is not allowed on the network. The end-point 120a and/or the controller 130 can then notify an administrator of the intrusion and further segregate the malicious device from the network.

In some embodiments, the mission profile 131 includes encryption keys for encrypting network traffic. The encryption keys are matched to the allowed end-points that have hardware identifiers in the mission profile 131. Each allowed end-point has a security decryption key matching one of the encryption keys. In this way, using the information in the mission profile 131, each end-point 120(a-c) can encrypt network traffic such that it can only be decrypted by the intended destination end-point. Network traffic received by other end-points or malicious devices attempting to connect to the network system will remain securely encoded, as each security decryption key is unique to each end-point.

In some embodiments, network traffic is communication packets or network messages containing data, instructions, or other electronic information intended for the device to which the network traffic is addressed.

For example, end-point 120a has a first security decryption key and end-point 120b has a second security decryption key. Both end-point 120a and 120b are allowed end-points with hardware identifiers 121a and 121b included in the mission profile 131. Because of this, a first and second encryption key, matching the first and second security decryption keys, respectively, are included in the mission profile. When network traffic needs to be sent to, for example, device 110a connected to end-point 120a, the controller 130 will provide the first encryption key in the mission profile to end-point 120b, which will encrypt the network traffic. After passing through the network, the network traffic will arrive at both end-points 120a and 120c. Even if both end-points 120a and 120c attempt to decrypt the network traffic, the actual data will only be decryptable by end-point 120a. In particular, end-point 120c, having another security decryption key, will not be able to decrypt the traffic. End-point 120a will be able to decrypt the network traffic, having the correct first security decryption key. After decrypting, end-point 120a will be able to pass the message on to connected device 110a. Further, any other devices, including the controller 130, connected to the network will not be able to decrypt the network traffic, as they also lack the first security decryption key. This security encryption scheme allows the end-points 120a and 120b to provide a software barrier to network traffic and ensure that decrypted data only reaches the devices for which it is intended.

In another embodiment, the network system 100 uses both filtering and encryption to secure transmission of network traffic. For example, end-point 120a has a first security decryption key and end-point 120b has a second security decryption key. Both end-point 120a and 120b are allowed end-points with hardware identifiers 121a and 121b included in the mission profile 131. Because of this, a first and second encryption key, matching the first and second security decryption keys, respectively, are included in the mission profile.

Further, end-points 120a and 120b both have a filter configured to drop or otherwise block traffic with an improper authentication code. After the controller 130 identifies that end-points 120a and 120b have hardware identifiers in the mission profile, they are able to join the network. End-point 120a identifies the device 110a connected to end-point 120a and provides this information to the controller 130. End-point 120b does the same for the device 110b connected to end-point 120b. After receiving this information, the controller 130 consults the mission profile 131 for a security level clearance for each device 110a and 110b. Based on the security clearance level, the controller 130 assigns and conveys an authorization code to each end-point. As used herein, an authorization code comprises any means to communicate data and have it receive by and/or readable by predetermined end-points 120(a, b). For example, the authorization code may comprise a network addressing scheme, a hash that is specific to an end-point hardware ID, a pseudo-random number sequence, or any other similar means. Further, as used herein, "addresses" and "addressing" are used in a broad sense such that these terms include any use of authorization codes. As such, a network "address" may refer to an end-point comprising a particular authorization code. Similarly, addressing a network communication may comprise communicating in such a way that the network communication is received and/or readable by a particular end-point that has a particular authorization code. The authorization code corresponds to the filter in each end-point such that the filter will reject network traffic not addressed to that specific end-point.

When network traffic needs to be sent to, for example, device 110a connected to end-point 120a, the transmitting end-point, for example end-point 120b, will use the appropriate encryption key in the mission profile and encrypt the network traffic. In such an embodiment, the mission profile is accessible to end-point 120b through communication with the controller 130 or alternatively, end-point 120b may directly retrieve the appropriate encryption key from end-point 120a.

The controller 130 or the respective end-point 120b will then address the network traffic to end-point 120a and device 110a. After passing through the network, the network traffic will arrive at both end-point 120a and 120b. The filter for end-point 120a will pass the network traffic, as it has a proper authorization code. The filter in end-point 120b, however, will reject and block the network traffic.

End-point 120a will decrypt the network traffic, having the correct first security decryption key. After decrypting, end-point 120a will be able to pass the message on to connected device 110a. Any other devices connected to the network will not be able to decrypt the network traffic, as they also lack the first security decryption key. Any other end-points connected to the network will not allow the network traffic through the filtering process. This combined security scheme allows the end-points 120a and 120b to provide a physical and software barrier to ensure that no device 110a or 110b sees network traffic for which it lacks security clearance. In some embodiments, the combined security scheme using filtering and encryption/decryption is configured to ensure need-to-know transmission.

As described, in at least one embodiment, each end-point 120a, 120b, and 120c provides a physical and software security barrier between the devices 110a and 110b and the controller 130. This barrier ensures that any device 110a and 110b connected to the network system 100 may only receive network traffic addressed to the device 110a and 110b and for which the device 110a and 110b has a security clearance level, as defined in the mission profile 131. This physical and software security barrier provides need-to-know assurance within the network system. In at least one embodiment, this barrier provides that no transmission may be received by or enter into any device 110a and 110b for which it is not intended. To this end, each end-point 120a and 120b is a separate device connected directly to each device 110a and 110b.

In an additional or alternative embodiment, the end-points 120a, 120b, and 120c provide translation between the devices 110a and 110b connected to the end-point 120a and 120b. For example, device 110a is an older device running old or obsolete software, sometimes called a legacy device. Often, due to the design parameters of devices such as legacy device 110a, updating the software for legacy device 110a is difficult, costly, or otherwise not possible. In some embodiments, the cost or difficulty of updating legacy device 110a requires that it only be updated periodically, sometimes after several years. As such, legacy device 110a cannot communicate with the network system 100, as the controller 130 is configured to run the network on a different version of software.

End-point 120a is configured to identify legacy devices such as legacy device 110a. When end-point 120a detects that legacy device 110a is connected, it identifies legacy device 110a. End-point 120a is further configured to communicate in a default software language and communication protocol for the network. The default software language and communication protocol may be updatable by the controller 130 in the event that its software is out of date. After identifying legacy device 110a, end-point 120a passes this information to the controller 130. The controller 130, in turn, provides end-point 120a with a translator profile that end-point 120a can use to convert the old or obsolete software language of legacy device 110a into network traffic using the default software language and communication protocol of the network. One will appreciate that when communicating with legacy devices, either the first end-point that is directly connected to the legacy device may perform the translation or the second end-point that is receiving data from the legacy device can perform the translation. In any case, however, communicating across the network itself may be performed using the default software language and communication protocol of the network. This has the advantage of allowing the network system 100 to make use of devices, including legacy devices, that may not communicate in the same software language as the network.

In yet another embodiment, where the end-points 120a and 120b provide security and filtering, as described above, the end-points 120a and 120b also provide the software translation as described above. In this way, a single piece of hardware, the end-point, can advantageously combine security protection, both through addressing and encryption/decryption, but also software translation for devices that may lack all of these features. Those skilled in the art will appreciate that changing system requirements often requires redesign of many system components, including requalification. The end-points in concert with the controller, when designed and qualified for a given set of system requirements, can allow any desired hardware to be connected and used in the network without requalification. Further, in system embodiments where software updates occur frequently, the controller and end-points can quickly and efficiently provide an interface that is adaptable to the connected devices, regardless of the connected devices' current software state or any barriers to that software In embodiments where controller 130 is considered a device 110a or 110b, the end-point 120a, 120b, or 120c may be a separate piece of hardware. In at least one embodiment, this is helpful in preventing transmissions within the network system 100 not intended for the controller 130 from entering into the controller 130. In some embodiments, this provides the physical and software security barrier between a plurality of controllers 130, allowing the plurality of controllers 130 to operate under a plurality of mission profiles 131 within the same network system 100. In contrast, in embodiments where the controller 130 is not treated as a device 110a or 110b, the end-point 120c may be either a separate piece of hardware or hardware integral to the controller 130. The barrier requirement of the network system 100 is still be met because the controller 130 in such embodiments has visibility to and provides control over all the network traffic and devices 110a and 110b. Additionally, in at least one embodiment, the end-point 120c at the controller 130 is virtualized in software to provide the same functionality as a hardware end-point 120c.

In at least one embodiment, the network system 100 is adapted and configured to provide multi-level security (MLS). In at least one embodiment, this is accomplished at least in part by the controller 130 providing overall network security control for the network system and the end-points 120a and 120b providing local network security control at each device 110a and 110b under the umbrella of the controller 130 and end-point 120c.

For example, in at least one embodiment, within the network system 100, the controller 130 uses the mission profile 131 to determine which end-points 120a and 120b may connect to the network system 100. The controller 130 helps ensures that no other end-points or devices may connect to the network, securing the network traffic from connections not supported in the mission profile 131. The end-points 120a and 120b identify devices 110a and 110b connected to the end-points 120a and 120b, respectively, and communicate this information to the controller 130. The controller 130 then assigns security clearance levels to each device 110a and 110b and corresponding end-points 120a and 120b and routes network traffic accordingly using addressing, encryption, or other secure means.

Accordingly, locally at each device 110a and 110b, the end-points 120a and 120b provides a physical security barrier to network traffic by filtering out network traffic not intended for the connected devices 110a and 110b. Further, the end-point 120a and 120b provides a software security barrier by decrypting and encrypting network traffic so that only the respectively connected device 110a or 110b may read it. Only network traffic with the proper encryption may be decrypted by the end-point 120a or 120b. The combination of the controller 130 operating security within the entire network system 100 and the end-points 120a, 120b, and 120c provides security for the network system 100 at multiple levels as required in an MLS scheme. Those skilled in the art will appreciate that this network system has the advantage of allowing an MLS system to be implemented using devices 110a and 110b that may individually lack a configuration capable of supporting MLS, but which can still be integrated into an MLS system through the features added by the controller 130 and the end-points 120a, 120b, and 120c.

In at least one embodiment, the network system 100 is adapted to provide open mission systems (OMS) support. This standard requires that the network system 100 provide services such that any device 110a or 110b may connect to the network system 100 regardless of whether or not the device 110a or 110b is configured to communicate with the network system 100. In some embodiments, this lack of ability to communicate may be the result of different hardware or software interfaces, different operating systems, different message or network traffic formatting, or other communication barriers.

In some embodiments, the network system 100 provides OMS support through the end-points 120a, 120b, and 120c, which provide translation and adaptation for any differences in hardware interfaces, software interfaces, operating systems, message formatting, network traffic formatting, or other communication barriers. For example, the end-points 120a, 120b, and 120c may comprise a variety of different communication ports that support different protocols. In at least one embodiment, an end-point 120a, 120b, or 120c communicates to the controller 130 through an Ethernet port. However, the end-point 120a, 120b, or 120c also comprises device-facing-ports such as a serial port, a SPI port, a USB port, a coaxial port, a second Ethernet port, or any other number of types of ports desired. In at least one embodiment, the end-point 120a or 120b communicates to the controller 130 through the Ethernet port and also communicates to the desired device 110a or 110b through any of the ports selected from the device-facing-ports.

For example, in at least one embodiment, the network system 100 is configured to communicate over Ethernet, such that the controller 130 and end-points 120a, 120b, and 120c connect to one another using Ethernet. However, one or more devices 110a, 110b may communicate using different means. For example, a first device 110a may use a serial port for communication. A second device 110b may use Ethernet communication, but communicates using an older version of the Ethernet protocol. For the first device 110a, the end-point 120a provides an Ethernet-to-serial hardware conversion, allowing the first device 110a to physically connect to the network system 100. The second device 110b connects to an Ethernet output of the end-point 120b and is able to physically connect to the network system 100. The end-point 120a connected to the first device 110a identifies the first device 110a to the network system 100 and the controller 130. The controller 130 identifies if software translation is required to convert network traffic from the Ethernet protocol to the serial protocol being used by the first device 110a. If the end-point 120a is capable of performing the software translation, it does so. If not, the controller 130 provides the end-point 120a with a translator profile that will allow the end-point 120a to translate the network traffic to the protocol of the first device 110a. For the second device 110b, the end-point 120b connected to the second device 110b will identify the second device 110b to the network system 100 and the controller 130. The controller 130 will then provide the end-point 120b with a translator profile for converting network traffic between the two Ethernet protocols.

Once the controller 130 has provided the end-points 120b and 120c with the translator profiles, the end-points 120a and 120b facilitates communication between the first and second devices 110a and 110b and the network system 100. The hardware and software translation provided by the end-points 120a and 120b and controller 130 allow the network system 100 to be open to connections from devices 110a and 110b with a variety of different hardware and software communication schemes, thus supporting an OMS architecture.

In at least one embodiment, each of the first and second devices 110a and 110b may be connected to a first and second end-point 120a and 120b, respectively. Each of the first and second end-points 120a and 120b handles the translation for the specific device 110a or 110b connected to it. In another embodiment, both the first and second devices are connected to a single end-point which handles translation for both the first and second devices.

In at least one embodiment, the network system 100 is configured for MLS support and not OMS support. In another embodiment, the network system 100 is configured for OMS support and not MLS support. In yet another embodiment, the network system 100 is configured for both MLS and OMS support. In such embodiments, the controller 130 and end-point 120a, 120b, and 120c are configured to provide the functionality necessary for both MLS and OMS.

Figure 2:
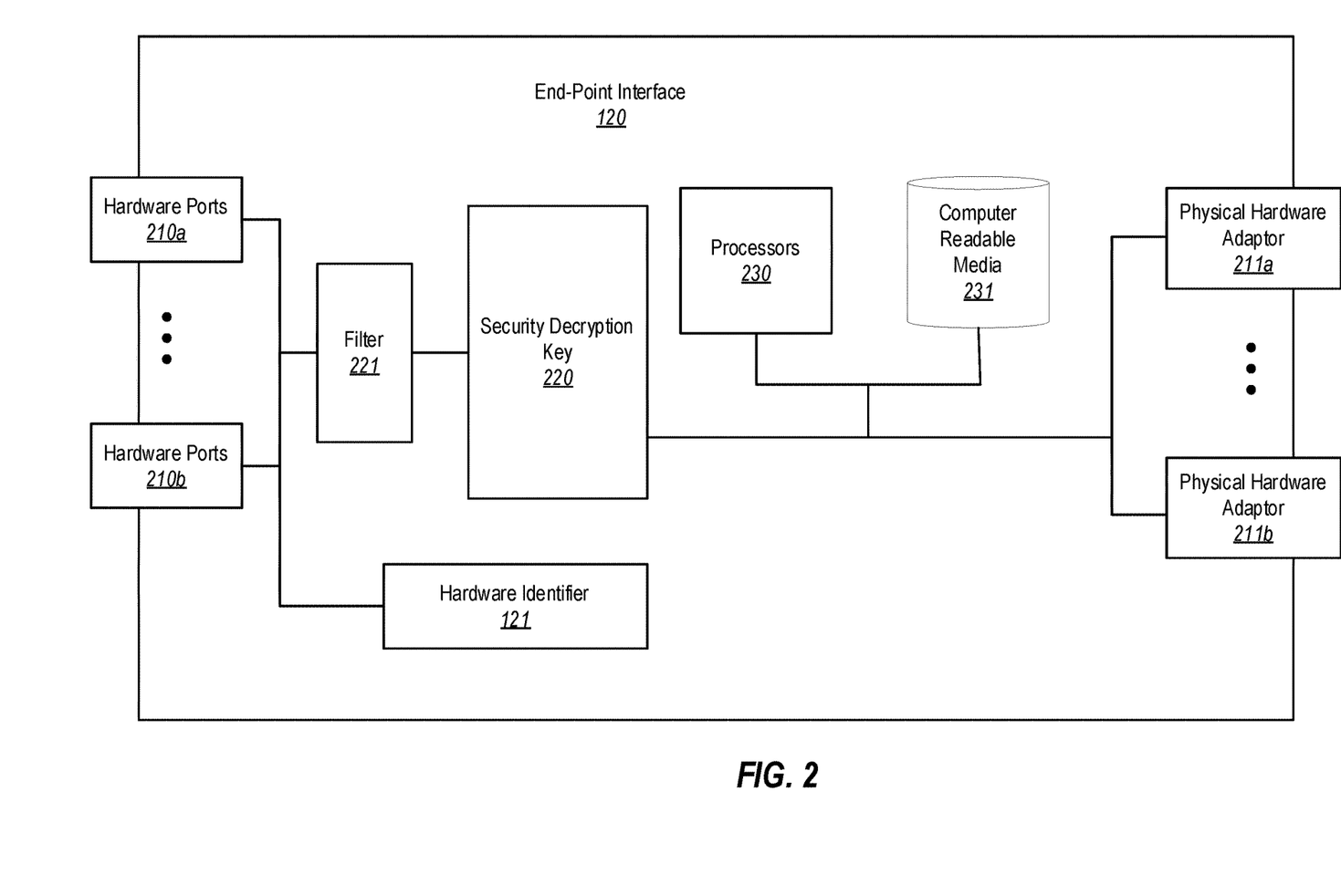
FIG. 2 illustrates an embodiment of an end-point for use in the network.

Referring now to FIG. 2, an end-point 120 is illustrated. The end-point 120 is configured to be connected to and pass network traffic between one or more devices 110a and 110b and the controller 130. In at least one embodiment, the end-point 120 comprises hardware ports 210a and 210b, physical hardware adaptors 211a and 211b, a hardware identifier 121 unique to each end-point 120, a filter 221, processors 230, and computer-readable media 231. In at least one embodiment, the end-point 120 further comprises a security decryption key 220 unique to each end-point 120.

In at least one embodiment, the hardware ports 210a and 210b allow for connection to a network system 100, including the controller 130. In at least one embodiment, the hardware ports 210a and 210b are Ethernet ports and the connection to the network system 100 is made through an Ethernet cable. In embodiments where the end-point 120c is virtualized, the hardware ports 210a and 210b are external connections on the controller 130 configured for connecting other end-points 120a and 120b to the controller 130. In at least one embodiment, these external connections are Ethernet ports.

In at least one embodiment, the physical hardware adaptors 211a and 211b allow for connection to devices 110a and 110b. In some embodiments, the physical hardware adaptors 211a and 211b are Ethernet, general-purpose input/output (GPIO), 10/100/1000 Base-T, serial peripheral interface (SPI), RS-232, RS-422, RS-485, 1553, serial, high voltage, 28-volt, discrete, or other connectors found on the devices 110a and 110b. As an example of the configuration of the hardware ports 210a and 210b and physical hardware adaptors 211a and 211b, in at least one embodiment, the end-point 120 has one or more Ethernet ports configured for connecting to the controller 130. The end-point 120 may also have one or more of each of the example physical hardware adaptors configured for connecting to devices 110a and 110b. This allows the end-point 120 to connect to a variety of devices 110a and 110b.

In embodiments where the end-point 120c is virtualized in the controller 130, the physical hardware adaptors 211a and 211b are connections existing within the controller with or without connectors or virtualized connections in software in the controller 130.

In at least one embodiment, the end-point 120 connects to a single device (e.g. 110a) and provides a single point of access to the network for that device 110a. In contrast, in at least one embodiment, the end-point 120 connects to a plurality of devices and provides a single point of access to the network system 100 for the plurality of devices. In such embodiments, the mission profile 131 allows for a single authorization code and security clearance level for the plurality of devices. In at least one embodiment, the end-point 120 distributes the network traffic to the plurality of devices connected to the end-point 120. The end-point identifies which of the plurality of devices connected to the end-point 120 are intended as recipients of the network traffic and only transmit the network traffic to those devices.

In at least one embodiment, the hardware identifier 121 identifies each end-point 120a, 120b, and 120c to the controller 130. For example, in at least one embodiment, end-point 120a has a hardware identifier 121a. When the controller 130 detects that the end-point 120a is attempting to connect to the network system 100, the controller 130 uses standard techniques known to those skilled in the art to request the hardware identifier 121a from end-point 120a. The controller 130 checks if the received hardware identifier 121a is contained in the mission profile 131. If it is, the controller 130 allows the end-point 120a to join the network system 100. If not, the control 130 does not allow the end-point 120a to join the network system 100.

As another example, in at least one embodiment, the end-point 120a has a hardware identifier 121a. When the controller 130 detects that the end-point 120a is attempting to connect to the network system 100, controller 130 sends end-point 120a a hash code. This hash code is based on the hardware identifiers included in the mission profile 131. Upon receiving the hash code, end-point 120a performs operations on the hash code based on the end-point 120a's unique hardware identifier 121a. These operations result in an output hash code, which end-point 120a then sends to controller 130. Controller 130 compares the output hash code against an expected hash code based on the hardware identifies contained in the mission profile 131. If the hardware identifier 121a is in the mission profile 131, the controller 130 will find a match and allow end-point 120a to join the network system 100. If not, the controller 130 will not allow the end-point 120a to join the network system 100.

In at least one embodiment, the filter 221 in each end-point 120 is configured to filter network traffic sent in the network system 100. The filter 221 drops or otherwise blocks network traffic not properly addressed to the devices 110a or 110b attached to the end-point 120 and passes network traffic properly addressed to the devices 110a or 110b attached to the end-point 120.

The processors 230 and computer-readable media 231 are configured to allow the end-point 120 to perform its various functions. In at least one embodiment, the processors 230 and computer-readable media 231 allow the end-point 120 to identify a device profile of the devices 110a or 110b connected to the end-point 120. As used herein, a device profile comprises identifications associated with at least a portion of the devices that are connected directly to the end-point 120. For example, the identification may comprise a communication protocol used by each device, a device name, a device type, a version of software on the device, a type of software on the device, and/or other similar identifiers. In another embodiment, the processors 230 and computer-readable media 231 allow the end-point 120 to decrypt network traffic passed by the filter 221 using the security decryption key 220. In yet another embodiment, the processors 230 and computer-readable media 213 allow the end-point 120 to, based upon the device profile, provide software translation between the other endpoints and the devices 110a and 110b connected to the end-point 120. Further, in at least one embodiment, the computer readable media 231 is used to store one or more authorization codes.

As explained above, in some embodiments of the network system 100, some devices 110a and 110b will communicate using message formats and protocols that are incompatible with the network system 100 or the controller 130. The end-point 120 is configured to, after identifying the device profile of the devices 110a or 110b connected to the end-point 120, send the device profile to the controller 130, and receive a translation profile from the controller 130 for providing the software translation between the controller 130 and the devices 110a and 110b connected to the end-point 120.

In some embodiments, the network traffic in the network system 100 is in a protocol or message format that the device 110a or 110b cannot understand. In such embodiments, after using the filter 221 to filter out network traffic not intended for the device 110a or 110b and using the security decryption key 220 to decrypt the network traffic intended for the device 110a or 110b, the end-point 120 translates the network traffic into a software language or format which the device 110a or 110b can read.

In some embodiments, the network traffic in the network system 100 uses an authorization code in a form or format not readable by intended recipient device 110a or 110b. In such embodiments, the end-point 120 provides translation between the device 110a or 110b and the controller 130 by receiving the network traffic, using the filter 221 to identify network traffic intended for the device 110a or 110b and translating any relevant or necessary addressing to a form that the device 110a or 110b can read.

In at least one embodiment, the form or format of the authorization code in the network system 100 is a hash. For example, a hash may be created by the controller 130 from one of the unique hardware identifiers 121a contained in the mission profile 131. The network traffic intended for the end-point 120a can then be addressed with this hash. In at least one embodiment, when each end-point 120a and 120b receives the network traffic, the filter 221 in each end-point 120a and 120b decrypts the hash and compares it to the end-point's hardware identifier 121a and 121b. In end-point 121b, there will be no match and the filter 221 in end-point 121b will drop or otherwise discard the network traffic. In end-point 121a, there will be a match and the filter 221 in end-point 121a will pass the network traffic on for decryption. This approach has the advantage of using a secure identification, the hardware identifier 121, to identify each end-point 120 to the controller 130 and provide a secure addressing scheme. The mission profile 131 provides the controller 130 with the hardware identifier 121 necessary to authenticate an end-point 120 into the network and to address network traffic so that only a specific end-point 120 receives the message.

In at least one embodiment, the end-point 120 contains translation profiles stored in computer-readable media 231 and uses them to provide translation after detecting the device profiles of the connected devices 110a or 110b. In such embodiments, the controller 130 receives the device profiles and determines if the translator profiles in the end-point 120 need to be updated. When needed, the controller 130 then uploads to the end-point 120 the updated versions of the translator profiles.

In at least one embodiment, all translator profiles are stored in a central location available to the controller 130 such that the controller 130 can provide the translator profiles to the end-point device 120 as described above. In at least one embodiment, the central location is in the controller 130. Those skilled in the art will recognize that this has the advantage of allowing the controller 130 to update the translator profiles in this central location at any time, including while offline from the network. Further, it allows the controller 130 to update the translator profiles in the central location without using the bandwidth of the end-point 120. In this way, the end-point 120 can, when necessary, primarily use its resources for communication within the network during missions under a mission profile 131.

In at least one embodiment, the storage of the translator profiles in the central location allows the end-point 120 to not persistently store any translator profiles. In such embodiments, the end-point 120 only retains translator profiles while in use in a mission under a mission profile 131. As such, the end-point 120 is only capable of providing translation for a device 110a or 110b when the controller 130 has supplied the end-point 120 with a translator profile. Those skilled in the art will recognize that this allows the end-point to store the translator profile in non-persistent memory, such as volatile memory.

In other embodiments, the end-point 120 will persistently store a translator profile for a device 110a or 110b until a new device is attached. For example, end-point 120a with device 110a connected is used by a first mission profile and receives a translator profile for device 110a. Later, when a second mission profile replaces the first mission profile, the end-point 120a is not included. Later still, a third mission profile is implemented that includes end-point 120a. Through all these mission profile changes, end-point 120a has retained the translator profile in persistent memory, such as non-volatile memory. When end-point 120a joins the network under the third mission profile, if device 110a is still connected, end-point 120a will be ready to provide translation immediately after verifying the translator profile with the controller 130. Alternatively, if other devices have been connected, controller 130 will replace the retained translator profile with the appropriate ones. This is advantageous in systems where end-point 120 is connected to the same devices regardless of the mission profile 131. In such systems, network startup overhead is reduced.

In some embodiments, an end-point 120 is configured to power down when connected to a device 110a or 110b that is not explicitly allowed in the mission profile 131. Additionally, in some embodiments, the end-points 120a, 120, and 120c are configured to only provide power to the physical hardware adaptors 211a and 211b that are connected to the devices 110a and 110b allowed within the mission profile.

Figure 3:
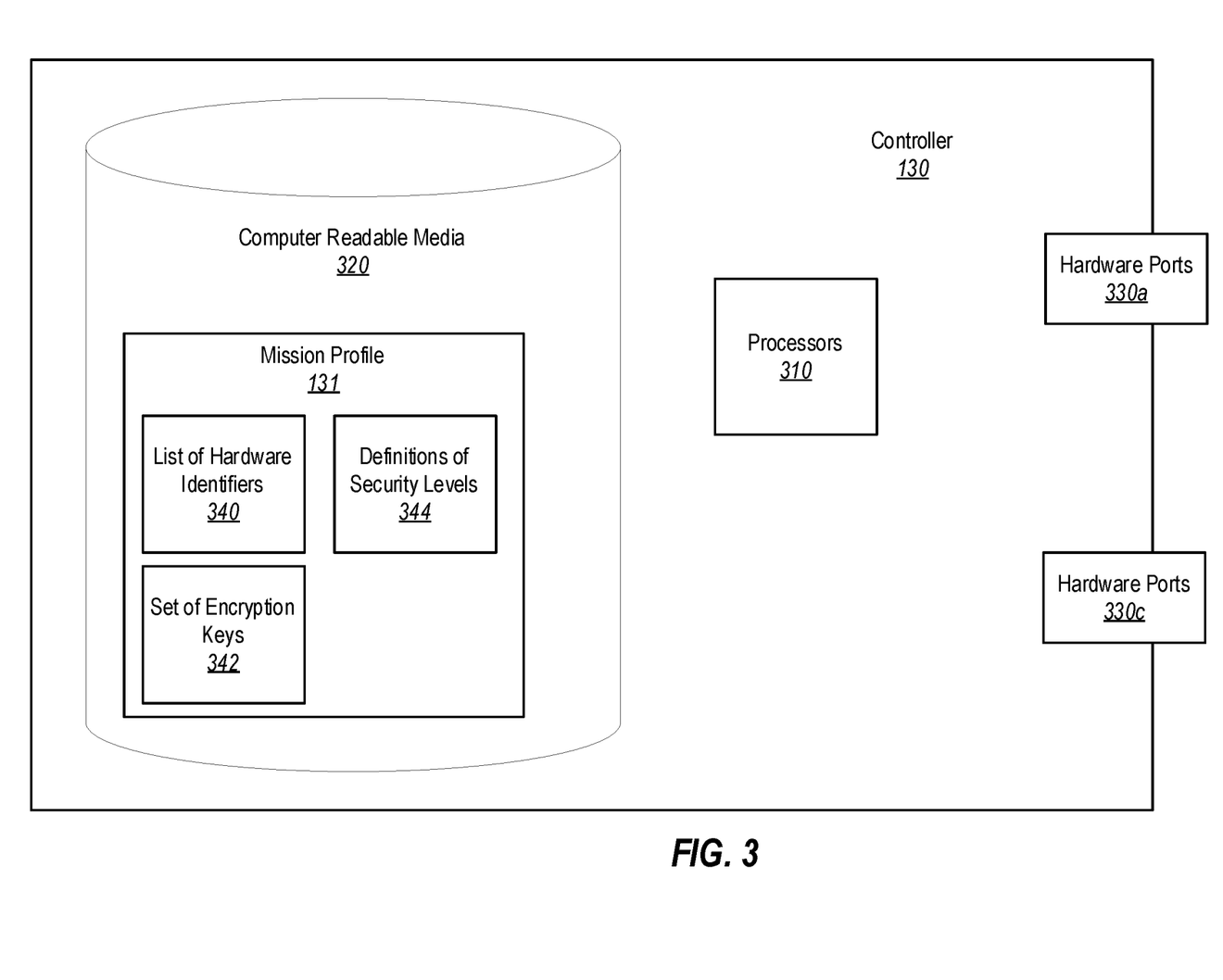
FIG. 3 illustrates an embodiment of a controller for use in the network end-point system.

Referring now to FIG. 3, the controller 130 is illustrated. In at least one embodiment, the controller 130 comprises processors 310, memory 320, a mission profile 131 stored in the memory 320, and hardware ports 330. The controller 130 is configured to provide dynamic network services for the devices 110a and 110b and the end-points 120a and 120b. In at least one embodiment, the mission profile 131 comprises a list of hardware identifiers 340, a set of encryption keys 342, and a description of security levels 344.

In at least one embodiment, the list of hardware identifiers 340 lists the hardware identifier 121 for each end-point 120 that is allowed to connect to the network system 100.

In at least one embodiment, the set of encryption keys 342 includes security encryption keys that correspond to the security decryption key 220 for each end-point 120 that is included in the list of hardware identifiers 340. In at least one embodiment, the description of security levels 344 provides definitions of the security levels for each device 110a and 110b that is connected to the network system 100. The description of security levels 344 may comprise a list of specific devices. The devices may be specified by type, a unique identification number, or any other defining characteristic that may be determined by the end-point 120 when identifying the device profile.

In at least one embodiment, the computer-readable media 320 has instructions stored thereon that are executable by the processors 310 to allow the controller 130 to identify each end-point 120 connected to the network system 100. In some embodiments, the instructions are further executable by the processors 310 to assign an authorization code and convey that authorization code to an end-point 120 when the end-point 120 is connected to the network and has a hardware identifier 121 that is included in the mission profile 131.

In at least one embodiment, the controller 130 is configured to not assign and convey authentication codes to end-points 120 without hardware identifiers 121 in the list of hardware identifiers 340 in the mission profile 131. No network traffic will be addressed to such end-points 120, ensuring that the filter 221 in those end-points 120 will drop or otherwise block all network traffic that those end-points 120 receive. Further, no network traffic will be encoded in a security encryption key from the set of security encryption keys 342 that can be decrypted using the security decryption key 220 in those end-points 120.

In at least one embodiment, the addressing of the end-point devices 120 is end-point specific. In at least one embodiment, where network traffic is to be routed to a plurality of end-points, the same network traffic is encrypted and addressed separately for each specific end-point device 120.

In some embodiments, the controller 130 is configured to dynamically monitor the network system 100. Dynamic monitoring comprises monitoring the network for new connections from end-points 120. In some embodiments, dynamic monitoring further comprises updating the translation profiles in the end-points 120a or 120b when the devices 110a or 110b connected to the end-points 120a or 120b change. In yet further embodiments, dynamic monitoring comprises updating the authorization code assigned to the end-point 120 when the network connection made by the end-point 120 changes status. In still further embodiments, dynamic monitoring comprises updating the authorization code assigned to the end-point 120 when the mission profile 131 changes. In further embodiments, dynamic monitoring comprises monitoring, controlling, and updating network settings based on changes in the hardware connections within the network system 100.

Figure 4:
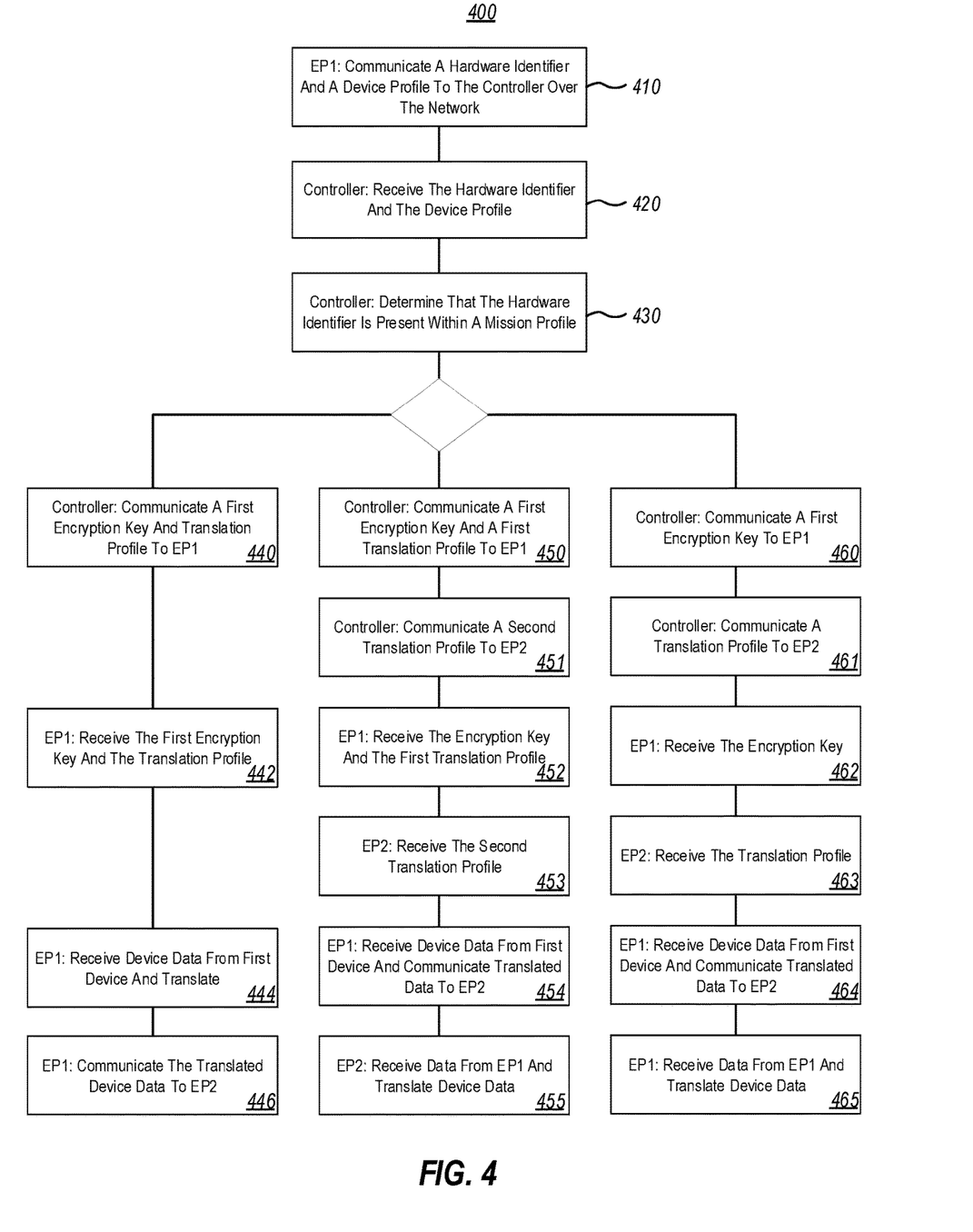
FIG. 4 depicts a flow chart of steps within an embodiment of a method for managing secure network communications.

FIG. 4 depicts a flow chart of steps within an embodiment of a method 400 for managing secure network communications. In particular, FIG. 4 depicts a flow chart of various acts performed when translating data within the network system 100. As used within FIG. 4, the indicator "EP1" indicates acts performed by or to a first end-point, the indicator "EP2" indicates acts performed by or to a second end-point, and the indicator "Controller" indicates acts performed by or to a controller.

For example in step 410, the first end-point 120a communicates a hardware identifier 121 (shown in FIG. 2) and a device profile to the controller 130 (shown in Figure) over the network 100. In step 420, the controller 130 receives the hardware identifier 121 and the device profile. In act 430, the controller 130 then determines that the hardware identifier 121 is present within a mission profile 131 (shown in FIG. 3).

Upon verifying that the hardware identifier 121 is presenting within the mission profile 131, various different embodiments may be used to provide translation services within the network system 100. For example, in step 440, the controller 130 may communicate a first encryption key and translation profile to the first end-point 120a. In step 442, the first end-point 120a receives the first encryption key and the translation profile from the controller 130. In step 444, the first end-point 120a then receives device data from a first device 110a (shown in FIG. 1). Using the translation profile, the first end-point 120a translates the devices data into the default software language and network protocol used by the network system 100. The first end-point 120a also encrypts the data using the first encryption key. In step 446, the first end-point 120a then communicates the encrypted and translated device data to a second end-point 120b. The second end-point 120b is able to decrypt the data using a private encryption key.

In contrast, in at least one embodiment, it may be necessary to translate data at both the first end-point 120a and the second end-point 120b. For example, a first device 110a connected to the first end-point 120a may require translation. That received data may then be sent to a second device 110b (shown in FIG. 1) attached to a second end-point 120b that also requires translation services. For instance, in step 450, the controller 130 may communicate a first encryption key and a first translation profile to the first end-point 120a. In step 451, the controller 130 may communicate a second translation profile to the second end-point 120b. In step 452, the first end-point 120a receives the first encryption key and the first translation profile from the controller 130. In step 453, the second end-point 120b also receives the second translation profile from the controller 130. In step 454, the first end-point 120a then receives device data from a first device 110a. Using the first translation profile, the first end-point 120a translates the devices data into the default software language and network protocol used by the network system 100. The first end-point 120a also encrypts the data using the first encryption key. The first end-point 120a then communicates the encrypted and translated device data to a second end-point 120b. In step 455, the second end-point 120b receives the encrypted and translated device data from the first end-point 120a. The second end-point 120b then decrypts the data using a private encryption key. The second end-point 120b translates the device data again using the second translation profile. The second end-point 120b then provides the twice-translated device data to the second device 110b that is connected to the second end-point 120b. As such, device data can be communicated between two different devices that both use legacy, or non-default, communication software and network protocols.

In yet another embodiment, device data may be communicated between a device that does communicate using the default network software language and network protocol to a legacy device connected to another end-point. For example, as indicated by step 460, the controller 130 may communicate an encryption key to the first end-point 120a. In step 461, the controller 130 may communicate a translation profile to the second end-point 120b. In step 462, the first end-point 120a receives the encryption key from the controller 130. In step 463, the second end-point 120b receives the translation profile from the controller 130. In step 464, the first end-point 120a then receives device data from a first device 110a. Because the first device 110a is already configured to communicate using the default software language and network protocols, the first end-point 120a does not need to translate the devices data. The first end-point 120a encrypts the device data using the encryption key and communicates the encrypted device data to the second end-point 120b. In step 465, the second end-point 120b receives the encrypted device data from the first end-point 120a. The second end-point 120b then decrypts the encrypted device data using a private encryption key. The second end-point 120b also translates the decrypted device data using the second translation profile. The translated device data is then provided to a second device 110b that is connected to the second end-point 120b.

Figure 6:
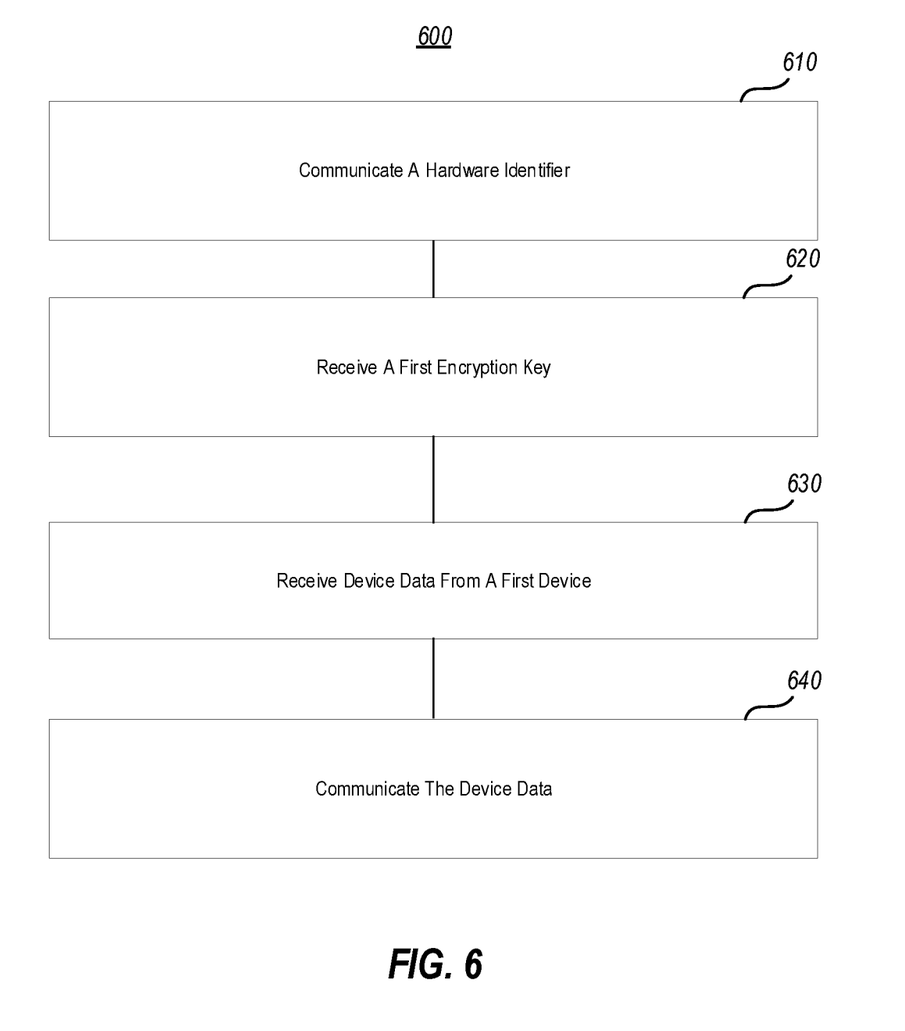
FIG. 6 depicts a flow chart of steps within still another embodiment of a method for managing secure network communications.
Figure 7:
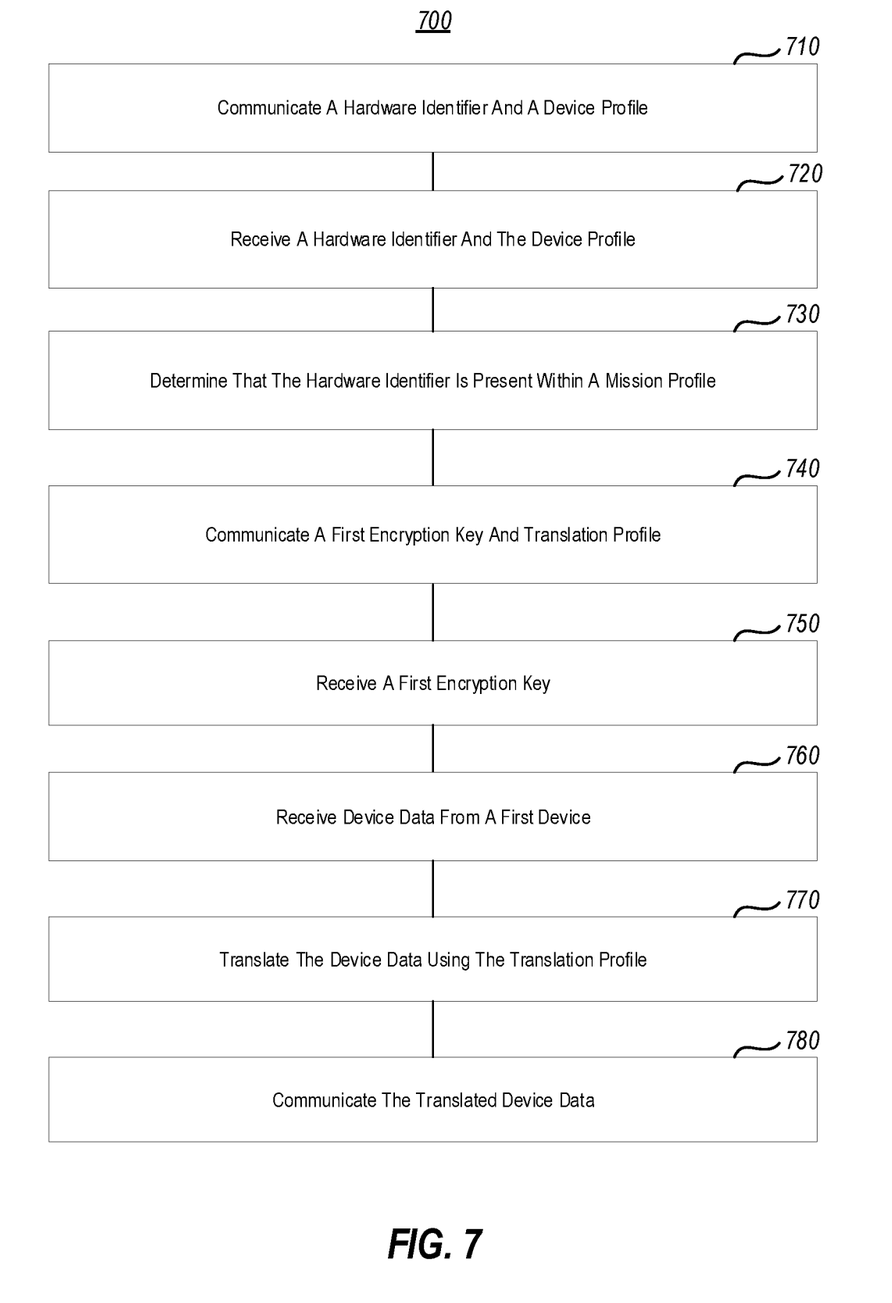
FIG. 7 depicts a flow chart of steps within yet another embodiment of a method for managing secure network communications.

One will appreciate that disclosed embodiments can also be described in terms of methods comprising one or more acts for accomplishing a particular result. For example, FIGS. 5-7 and the corresponding text illustrate flowcharts of a sequence of acts methods for managing secure network communications. The acts of FIGS. 5-7 are described below with reference to the components and modules illustrated in FIGS. 1-4.

Figure 5:
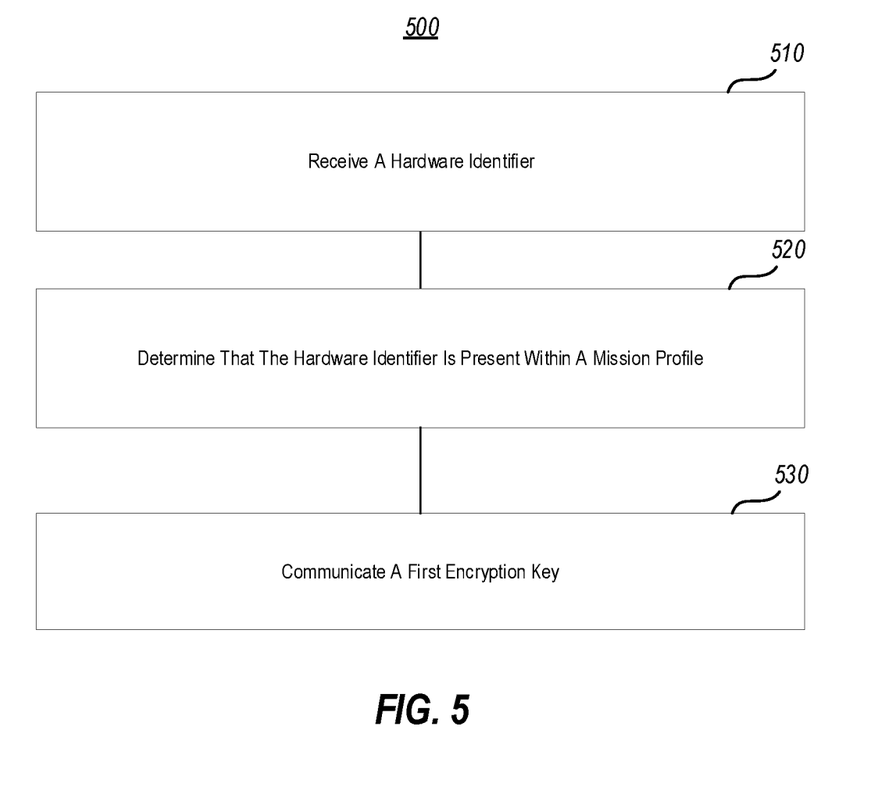
FIG. 5 depicts a flow chart of steps within another embodiment of a method for managing secure network communications.

For instance, FIG. 5 illustrates that a method 500 for managing secure network communications comprises an act 510 of receiving a hardware identifier. Act 510 comprises receiving, at a controller, a unique hardware identifier from a first end-point that is in communication with a network. For example, as depicted and described with respect to FIG. 1 and FIG. 2, a hardware identifier 121 is associated with an end-point interface 120 (also referred to as an "end-point"). The end-point communicates the hardware identifier to a controller 130.

Additionally, method 500 includes an act 520 of determining that the hardware identifier 121 is present within a mission profile 131. Act 520 comprises determining that the unique hardware identifier 121 is present within a mission profile 131, wherein the mission profile 131 comprises an indication of a second end-point 120b to which the first-endpoint 120a is allowed to communicate. For example, as depicted and described with respect to FIG. 1, FIG. 2, and FIG. 3, the controller 130 comprises a mission profile 131. The mission profile 131 contains the unique hardware identifiers for each end-point that is allowed to communicate on the network. Additionally, the mission profile 131 may also define which end-points 120 are allowed to communicate with each other.

The method 500 also includes an act 530 of communicating a first encryption key. Act 530 comprises communicating to the first end-point 120a a first encryption key that is uniquely matched to a decryption key privately held by the second end-point 120*b*. For example, as depicted and described with respect to FIG. 1, FIG. 2, and FIG. 3, the controller 130 is associated with a computer-readable media 320. That media stores a set of encryption keys. The encryption keys are associated with each end-point 120. A first end-point 120*a* is able to request an encryption key for a second end-point 120*b*. If the mission profile 131 allows the two end-points 120(*a, b*) to communicate, the controller 130 communicates the appropriate encryption key to the first end-point 120*a*. The communicated encryption key is a sibling of a decryption key that is held by the second end-point 120*b*.

An additional embodiment of a method 600 for managing secure network communications is depicted in FIG. 6. The method 600 includes an act 610 of communicating a hardware identifier. Act 610 comprises communicating, to a controller, a unique hardware identifier that is associated with a first end-point. For example, as depicted and described with respect to FIG. 1 and FIG. 2, a hardware identifier 121 is associated with an end-point interface 120 (also referred to as an "end-point"). The end-point communicates the hardware identifier to a controller 130.

Additionally, method 600 includes an act 620 of receiving a first encryption key. Act 620 comprises receiving from the controller 130 a first encryption key that is uniquely matched to a decryption key privately held by a second end-point 120*b*. For example, as depicted and described with respect to FIG. 1, FIG. 2, and FIG. 3, the controller 130 is associated with a computer-readable media 320. That media stores a set of encryption keys. The encryption keys are associated with each end-point 120. A first end-point 120*a* is able to request an encryption key for a second end-point 120*b*. If the mission profile 131 allows the two end-points 120(*a, b*) to communicate, the controller 130 communicates the appropriate encryption key to the first end-point 120*a*. The communicated encryption key is a sibling of a decryption key that is held by the second end-point 120*b*.

Method 600 also includes an act 630 of receiving device data from a first device; Act 630 comprises receiving device data from a first device in direct communication with the first end-point. For example, as depicted and described with respect to FIG. 1, each of the end-points 120(*a, b*) are associated with one or more devices 110(*a, b*). The devices may comprise data sources such as sensors. In at least one embodiment, the first end-point 120*a* receives data, such as sensor data, from a first device 110*a*.

Further, method 600 includes an act 640 of communicating the device data. Act 640 comprises communicating the device data to the second end-point 120*b*, wherein the device data is encrypted using the first encryption key. For example, as depicted and described with respect to FIG. 1, the first end-point 120*a* may desire to communicate the device data to a device that is connected to the second end-point 120*b*. Prior to communicating the device data, the first end-point encrypts the data using a first encryption key that is unique to the second end-point 120*b*. By encrypting the data using the first encryption key, the first end-point 120*a* is able to ensure that no other device is able to decipher the communication in route to the second end-point 120*b*.

In yet a further embodiment, a method 700 for managing secure communications in a network comprises an act 710 of communicating a hardware identifier and a device profile. Act 710 comprises communicating, to a controller, a unique hardware identifier that is associated with a first end-point and a device profile from the first end-point, wherein the device profile indicates the first device that is in direct communication with the first end-point. For example, as depicted and described with respect to FIG. 1 and FIG. 2, a hardware identifier 121 is associated with an end-point interface 120. Each end-point is also associated with a device profile. The device profile comprises identifications associated with at least a portion of the devices that are connected directly to the end-point 120. For example, the identification may comprise a communication protocol used by each device, a device name, a device type, a version of software on the device, a type of software on the device, and/or other similar identifiers. The end-point communicates the hardware identifier and the device profile to a controller 130.

Additionally, method 700 includes an act 720 of receiving the hardware identifier and the device profile. Act 720 comprises receiving, at a controller, a unique hardware identifier and a device profile from a first end-point that is in communication with a network. For example, as depicted and described with respect to FIG. 1 and FIG. 2, a hardware identifier 121 and a device profile are associated with an end-point interface 120 (also referred to as an "end-point"). The end-point communicates the hardware identifier and a device profile to a controller 130.

Method 700 includes an act 730 of determining that the hardware identifier 121 is present within a mission profile 131. Act 730 comprises determining that the unique hardware identifier 121 is present within a mission profile 131, wherein the mission profile 131 comprises an indication of a second end-point 120*b* to which the first-endpoint 120*a* is allowed to communicate. For example, as depicted and described with respect to FIG. 1, FIG. 2, and FIG. 3, the controller 130 comprises a mission profile 131. The mission profile 131 contains the unique hardware identifiers for each end-point that is allowed to communicate on the network. Additionally, the mission profile 131 may also define which end-points 120 are allowed to communicate with each other. The controller 130 may manage the encryption keys such that only end-points that are allowed to communicate with each other have each others' encryption keys.

The method 700 also includes an act 740 of communicating a first encryption key and a translation profile. Act 740 comprises communicating to the first end-point a first encryption key that is uniquely matched to a decryption key privately held by the second end-point and a first translation profile that comprises instructions for communicating over a particular hardware adaptor with the first device. For example, as depicted and described with respect to FIG. 1, FIG. 2, and FIG. 3, the controller 130 is associated with a computer-readable media 320. That media stores a set of encryption keys. The encryption keys are associated with each end-point 120. A first end-point 120*a* is able to request an encryption key for a second end-point 120*b*. If the mission profile 131 allows the two end-points 120(*a, b*) to communicate, the controller 130 communicates the appropriate encryption key to the first end-point 120*a*. The communicated encryption key is a sibling of a decryption key that is held by the second end-point 120*b*. The controller 130 also communicates a translation profile that allows the first end-point 120*a* to communicate through the correct protocol, or software language, of the attached device 110*a*.

Method 700 additionally includes an act 750 of receiving a first encryption key. Act 750 comprises receiving from the controller the first encryption key and the translation profile. For example, as depicted and described with respect to FIG. 1, FIG. 2, and FIG. 3, the controller 130 is associated with a computer-readable media 320. That media stores a set of encryption keys and translation profiles. The encryption keys are associated with each end-point 120. The translation profiles are associated with various devices 110(a, b). A first end-point 120a is able to request an encryption key for a second end-point 120b. If the mission profile 131 allows the two end-points 120(a, b) to communicate, the controller 130 communicates the appropriate encryption key to the first end-point 120a. The communicated encryption key is a sibling of a decryption key that is held by the second end-point 120b. The first end-point 120a also receives a translation profile that enables it to communicate with device 110a.

Method 700 also includes an act 760 of receiving device data from a first device. Act 660 comprises receiving device data from a first device in direct communication with the first end-point. For example, as depicted and described with respect to FIG. 1, each of the end-points 120(a, b) are associated with one or more devices 110(a, b). The devices may comprise data sources such as sensors. In at least one embodiment, the first end-point 120a receives data, such as sensor data, from a first device 110a.

Further, method 700 includes an act 770 of translating the device data using the translation profile. Act 770 comprises generating translated device data from the device data using the translation profile, wherein the translated device data is translated into a default software language and network protocol. For example, in at least one embodiment, the network system 100 may communicate in a particular software language (i.e., protocol) that is different that the device 110a. Further, in at least one embodiment, the first end-point 120a may not be configured to communicate or understand the device 110a. In such a case, the translation profile, enables to the first end-point 120a to translate data received from the device 110a into a software language that is understandable by the network system 100.

Further still, method 700 includes an act 780 of communicating the translated device data. Act 780 comprises communicating the translated device data to the second end-point, wherein the device data is encrypted using the first encryption key. For example, as depicted and described with respect to FIG. 1, the first end-point 120a may desire to communicate the translated device data to a device that is connected to the second end-point 120b. Prior to communicating the translated device data, the first end-point encrypts the data using a first encryption key that is unique to the second end-point 120b. By encrypting the data using the first encryption key, the first end-point 120a is able to ensure that no other device is able to decipher the communication in route to the second end-point 120b.

Further, the devices and methods described above may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks.

In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system for managing secure network communications, comprising:
   one or more processors; and
   one or more computer-readable media having stored thereon executable instructions that when executed by the one or more processors configure the computer system to perform at least the following:
   receive, at a controller, a unique hardware identifier from a first end-point that is in communication with a network;
   determine that the unique hardware identifier is present within a mission profile, wherein the mission profile comprises an indication of a second end-point to which the first-endpoint is allowed to communicate; and
   communicate to the first end-point a first encryption key that is uniquely matched to a decryption key privately held by the second end-point.

2. The computer system as recited in claim 1, wherein the executable instructions include instructions that are executable to configure the computer system to:
   receive, at the controller, a device profile from the first end-point, wherein the device profile indicates a particular device that is in direct communication with the first end-point;
   determine that the device profile is present within a mission profile as being associated with the first end-point; and
   communicate to either the first end-point, or a second end-point, or both, a first translation profile, wherein the first translation profile comprises a communication protocol for communicating with the particular device, and a software translation for allowing a first device's data to be understood by the second device.

3. The computer system as recited in claim 2, wherein the first end-point comprises a plurality of different hardware adaptors that are configured for connecting to different devices and at least one network adapter that is configured for connecting to the network, the network adaptor being different than the plurality of hardware adaptors.

4. The computer system as recited in claim 3, wherein the translation profile comprises instructions for communicating over a particular hardware adaptor selected from the plurality of hardware adaptors.

5. The computer system as recited in claim 1, wherein the controller comprises the mission profile stored in memory, the mission profile comprising:
   one or more encryption keys corresponding to one or more decryption keys for the one or more end-points that are allowed to connect to the network; and
   definitions of one or more security levels for the one or more devices that are allowed to connect to the network.

6. The computer system as recited in claim 1, wherein the executable instructions include instructions that are executable to configure the computer system to:
   communicate to the first end-point a first authorization code, wherein the first authorization code is unique to the first end-point.

7. The computer system as recited in claim 6, wherein the executable instructions include instructions that are executable to configure the computer system to:
   generate the first authorization code through a hash that is specific to the unique hardware identifier of the first end-point.

8. The computer system as recited in claim 6, wherein the executable instructions include instructions that are executable to configure the computer system to:
   address communication to the first end-point by associating the first authorization code with the communication.

9. A computer system for managing secure network communications by an end-point, comprising:
   one or more processors; and
   one or more computer-readable media having stored thereon executable instructions that when executed by the one or more processors configure the computer system to perform at least the following:
   communicate, to a controller, a unique hardware identifier that is associated with a first end-point;
   receive from the controller a first encryption key that is uniquely matched to a decryption key privately held by a second end-point;
   receive device data from a first device in direct communication with the first end-point; and
   communicate the device data to the second end-point, wherein the device data is encrypted using the first encryption key.

10. The computer system as recited in claim 9, wherein the executable instructions include instructions that are executable to configure the computer system to:
    communicate to the controller a device profile from the first end-point, wherein the device profile indicates the first device that is in direct communication with the first end-point; and
    receive from the controller a first translation profile, wherein the first translation profile comprises a communication protocol for communicating with the first device.

11. The computer system as recited in claim 10, wherein the first end-point comprises a plurality of different hardware adaptors that are configured for connecting to different devices and at least one network adapter that is configured for connecting to the network, the network adaptor being different than the plurality of hardware adaptors.

12. The computer system as recited in claim 11, wherein the translation profile comprises instructions for communicating over a particular hardware adaptor selected from the plurality of hardware adaptors.

13. The computer system as recited in claim 9, wherein the executable instructions include instructions that are executable to configure the computer system to:
    communicate to the controller the device profile from the first end-point, wherein the device profile indicates the first device and a second device that are in direct communication with the first end-point; and receive from the controller a second translation profile, wherein:
- the second translation profile comprises a communication protocol for communicating with the translation device; and
- the second translation profile is different than the first translation profile.

14. The computer system as recited in claim 9, wherein the controller comprises a mission profile stored in memory, the mission profile comprising:
- one or more encryption keys corresponding to one or more decryption keys for the one or more end-points that are allowed to connect to the network; and
- definitions of one or more security levels for the one or more devices that are allowed to connect to the network.

15. The computer system as recited in claim 9, wherein the executable instructions include instructions that are executable to configure the computer system to:
- receive from the controller a first authorization code, wherein the first authorization code is unique to the first end-point.

16. The computer system as recited in claim 15, wherein the executable instructions include instructions that are executable to configure the computer system to:
- receive, at the first end-point, a network communication associated with the second authorization code; and
- drop the network communication.

17. The computer system as recited in claim 9, wherein the executable instructions include instructions that are executable to configure the computer system to:
- receive from the controller a second authorization code, wherein the second authorization code is unique to the second end-point.

18. The computer system as recited in claim 17, wherein the executable instructions include instructions that are executable to configure the computer system to:
- address communication to the second end-point by associating the second authorization code with the communication.

19. The computer system as recited in claim 9, wherein the first device is not compatible with the controller due to different communication protocols.

20. A method for managing secure network communications by an end-point, the method comprising:
- communicating, to a controller, a unique hardware identifier that is associated with a first end-point and a device profile from the first end-point, wherein the device profile indicates the first device that is in direct communication with the first end-point;
- receiving, at the controller, the unique hardware identifier and the device profile from the first end-point that is in communication with a network;
- determining, at the controller, that the unique hardware identifier is present within a mission profile, wherein the mission profile comprises an indication of a second end-point to which the first-endpoint is allowed to communicate;
- communicating to the first end-point a first encryption key that is uniquely matched to a decryption key privately held by the second end-point and a first translation profile that comprises instructions for communicating over a particular hardware adaptor with the first device;
- receiving from the controller the first encryption key and the translation profile;
- receiving device data from a first device in direct communication with the first end-point;
- generating translated device data from the device data using the translation profile, wherein the translated device data is translated into a software language that is understandable by the controller; and
- communicating the translated device data to the second end-point, wherein the device data is encrypted using the first encryption key.

* * * * *